US008715083B2

(12) United States Patent  
Koplar

(10) Patent No.: US 8,715,083 B2
(45) Date of Patent: May 6, 2014

(54) METHODS AND SYSTEMS FOR PROCESSING GAMING DATA

(75) Inventor: Edward J. Koplar, St. Louis, MO (US)

(73) Assignee: Koplar Interactive Systems International, L.L.C., St. Louis, MO (US)

( * ) Notice: Subject to any disclaimer, the term of this patent is extended or adjusted under 35 U.S.C. 154(b) by 479 days.

(21) Appl. No.: 12/487,168

(22) Filed: Jun. 18, 2009

(65) Prior Publication Data

US 2010/0323797 A1 Dec. 23, 2010

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC .................................................. 463/42; 463/9

(58) Field of Classification Search
CPC .......... G06Q 30/02; A63F 2300/8064; H04N 21/4758
USPC .......................................................... 463/42
See application file for complete search history.

(56) References Cited

U.S. PATENT DOCUMENTS

| 4,101,927 A | 7/1978 | Isono et al. |
| 4,503,288 A | 3/1985 | Kessler |
| 4,540,880 A | 9/1985 | Hipko |
| 4,620,877 A | 11/1986 | Skukowski |
| 4,642,682 A | 2/1987 | Orsburn et al. |
| 4,656,342 A | 4/1987 | Ugon |
| 4,688,102 A | 8/1987 | Edakubo et al. |
| 4,691,245 A | 9/1987 | Hickok |
| 4,745,468 A | 5/1988 | Von Kohorn |
| 4,789,371 A | 12/1988 | Boggs et al. |
| 4,807,031 A | 2/1989 | Broughton et al. |
| 4,851,651 A | 7/1989 | Gaucher |
| 4,876,592 A | 10/1989 | Von Kohorn |
| 4,926,255 A | 5/1990 | Von Kohorn |
| 5,034,807 A | 7/1991 | Von Kohorn |

(Continued)

FOREIGN PATENT DOCUMENTS

| EP | 7133335 | 5/1996 |
| GB | 2161629 | 1/1986 |

(Continued)

OTHER PUBLICATIONS

Non Final Office Action for U.S. Appl. No. 11/876,548 dated Apr. 2, 2008, 10 pages.

(Continued)

*Primary Examiner* — Kevin Y Kim
(74) *Attorney, Agent, or Firm* — The Small Patent Law Group LLC; Christopher R. Carroll

(57) ABSTRACT

Methods and systems for content processing are described. In one embodiment, gaming data is received from a gaming source server. The gaming data associated with a game. A content signal is received from a signal source during presentation of programming content. The programming content is associated with the content signal and the game. A determination of whether the content signal includes the trigger is made. The device content is presented using the gaming data. The device content is in synchronization with the presentation of the programming content based on a determination that the content signal includes a trigger. Additional methods and systems are disclosed.

26 Claims, 5 Drawing Sheets

(56) References Cited

U.S. PATENT DOCUMENTS

| | | | |
|---|---|---|---|
| 5,057,915 A | 10/1991 | Von Kohorn | |
| 5,070,404 A | 12/1991 | Bullock et al. | |
| 5,128,752 A | 7/1992 | Von Kohorn | |
| 5,136,644 A | 8/1992 | Audebert et al. | |
| 5,214,792 A | 5/1993 | Alwadish | |
| 5,227,874 A | 7/1993 | Von Kohorn | |
| 5,233,423 A | 8/1993 | Jernigan et al. | |
| 5,249,044 A | 9/1993 | Von Kohorn | |
| 5,253,345 A | 10/1993 | Fernandes et al. | |
| 5,262,860 A | 11/1993 | Fitzpatrick et al. | |
| 5,283,734 A | 2/1994 | Von Kohorn | |
| 5,285,278 A | 2/1994 | Holman | |
| 5,287,181 A | 2/1994 | Holman | |
| 5,301,353 A | 4/1994 | Berras et al. | |
| 5,343,239 A | 8/1994 | Lappington et al. | |
| 5,410,326 A | 4/1995 | Goldstein | |
| 5,423,555 A | 6/1995 | Kidron | |
| 5,461,426 A | 10/1995 | Limberg et al. | |
| 5,483,276 A | 1/1996 | Brooks et al. | |
| 5,488,423 A | 1/1996 | Walkingshaw et al. | |
| 5,488,571 A | 1/1996 | Jacobs et al. | |
| 5,500,681 A | 3/1996 | Jones | |
| 5,510,845 A | 4/1996 | Yang et al. | |
| 5,523,794 A | 6/1996 | Mankovitz et al. | |
| 5,526,035 A | 6/1996 | Lappington et al. | |
| 5,535,147 A | 7/1996 | Jacobs et al. | |
| 5,550,578 A | 8/1996 | Hoarty et al. | |
| 5,555,024 A | 9/1996 | Limberg | |
| 5,557,333 A | 9/1996 | Jungo et al. | |
| 5,561,467 A | 10/1996 | Takeuchi et al. | |
| 5,577,266 A | 11/1996 | Takahisa et al. | |
| 5,594,493 A | 1/1997 | Nemirofsky | |
| 5,675,395 A | 10/1997 | Martin et al. | |
| 5,697,844 A | 12/1997 | Von Kohorn | |
| 5,708,476 A | 1/1998 | Myhrvold et al. | |
| 5,734,413 A | 3/1998 | Lappington et al. | |
| 5,737,417 A | 4/1998 | Buynak et al. | |
| 5,739,866 A | 4/1998 | Kim et al. | |
| 5,742,845 A | 4/1998 | Wagner | |
| 5,761,601 A | 6/1998 | Nemirofsky et al. | |
| 5,764,275 A | 6/1998 | Lappington et al. | |
| 5,767,896 A | 6/1998 | Nemirofsky | |
| 5,789,371 A | 8/1998 | Tracy et al. | |
| 5,789,732 A | 8/1998 | McMahon et al. | |
| 5,815,127 A | 9/1998 | Jacobs et al. | |
| 5,816,918 A | 10/1998 | Kelly et al. | |
| 5,831,679 A | 11/1998 | Montgomery et al. | |
| 5,835,388 A | 11/1998 | Helm | |
| 5,880,769 A | 3/1999 | Nemirofsky et al. | |
| 5,907,350 A | 5/1999 | Nemirofsky | |
| 5,946,635 A | 8/1999 | Dominguez | |
| 5,953,047 A | 9/1999 | Nemirofsky | |
| 6,016,338 A | 1/2000 | Bansal et al. | |
| 6,024,288 A | 2/2000 | Gottlich et al. | |
| 6,061,660 A | 5/2000 | Eggleston et al. | |
| 6,068,183 A | 5/2000 | Freeman et al. | |
| 6,076,069 A | 6/2000 | Laor | |
| 6,091,822 A | 7/2000 | Mellows et al. | |
| 6,094,228 A | 7/2000 | Ciardullo et al. | |
| 6,097,877 A | 8/2000 | Katayama et al. | |
| 6,100,883 A | 8/2000 | Hoarty | |
| 6,104,334 A | 8/2000 | Allport | |
| 6,177,950 B1 | 1/2001 | Robb | |
| 6,223,348 B1 | 4/2001 | Hayes et al. | |
| 6,229,572 B1 | 5/2001 | Ciardullo et al. | |
| 6,256,019 B1 | 7/2001 | Allport | |
| 6,256,070 B1 | 7/2001 | Frank | |
| 6,278,499 B1 | 8/2001 | Darbee et al. | |
| 6,327,573 B1 | 12/2001 | Walker et al. | |
| 6,330,034 B1 | 12/2001 | Renner et al. | |
| 6,351,289 B1 | 2/2002 | Chen et al. | |
| 6,592,044 B1 | 7/2003 | Wong et al. | |
| 6,681,393 B1 | 1/2004 | Bauminger et al. | |
| 6,681,905 B2 | 1/2004 | Edmondson et al. | |
| 7,057,666 B2 | 6/2006 | Folio | |
| 7,071,994 B2 | 7/2006 | Harris et al. | |
| 7,213,254 B2 | 5/2007 | Koplar et al. | |
| 7,296,282 B1 | 11/2007 | Koplar et al. | |
| 7,351,149 B1* | 4/2008 | Simon et al. | 463/42 |
| 7,552,456 B2 | 6/2009 | Ciardullo et al. | |
| 7,590,992 B2 | 9/2009 | Koplar et al. | |
| 7,627,879 B2 | 12/2009 | Koplar et al. | |
| 7,727,062 B2* | 6/2010 | Herrmann et al. | 463/16 |
| 2003/0211881 A1* | 11/2003 | Walker et al. | 463/20 |
| 2004/0220858 A1* | 11/2004 | Maggio | 705/14 |
| 2007/0167239 A1* | 7/2007 | O'Rourke | 463/42 |
| 2007/0226508 A1 | 9/2007 | Maltagliati et al. | |
| 2007/0247278 A1* | 10/2007 | Petrovic et al. | 340/5.28 |
| 2008/0076555 A1* | 3/2008 | Silver et al. | 463/31 |
| 2008/0208642 A1 | 8/2008 | Koplar et al. | |
| 2009/0233715 A1* | 9/2009 | Ergen et al. | 463/41 |
| 2009/0253476 A1 | 10/2009 | Pestotnik | |
| 2010/0319043 A1* | 12/2010 | Jain et al. | 725/110 |

FOREIGN PATENT DOCUMENTS

| | | |
|---|---|---|
| WO | 9843158 A1 | 10/1998 |
| WO | 9904568 A1 | 1/1999 |
| WO | 9934599 A1 | 7/1999 |
| WO | 0117262 A1 | 3/2001 |
| WO | 02084909 A1 | 10/2002 |

OTHER PUBLICATIONS

Amendment for U.S. Appl. No. 11/876,548 dated Aug. 4, 2008, 22 pages.

Final Rejection for U.S. Appl. No. 11/876,548 dated Oct. 29, 2008; 11 pages.

Amendment and Request for Continued Examination for U.S. Appl. No. 11/876,548 dated Jan. 29, 2009, 9 pages.

Non-Final Rejection for U.S. Appl. No. 11/876,548 dated Mar. 23, 2009, 6 pages.

Amendment for U.S. Appl. No. 11/876,548 dated May 28, 2009, 12 pages.

Notice of Allowance for U.S. Appl. No. 11/876,548 dated Aug. 26, 2009, 4 pages.

Preliminary Amendment for U.S. Appl. No. 09/489,373 dated Mar. 8, 2002, 9 pages.

Non-Final Office Action for U.S. Appl. No. 09/489,373 dated Dec. 4, 2003; 30 pages.

Response for U.S. Appl. No. 09/489,373 dated Mar. 4, 2004, 33 pages.

Examiner's Interview for U.S. Appl. No. 09/489,373 dated Apr. 23, 2004, 2 pages.

Response for U.S. Appl. No. 09/489,373 dated Apr. 27, 2004, 15 pages.

Non-Final Office Action for U.S. Appl. No. 09/489,373 dated Jul. 6, 2004, 35 pages.

Response for U.S. Appl. No. 09/489,373 dated Oct. 6, 2004, 35 pages.

Examiner's Interview for U.S. Appl. No. 09/489,373 dated Dec. 15, 2004, 2 pages.

Response for U.S. Appl. No. 09/489,373 dated Dec. 17, 2004, 11 pages.

Final Office Action for U.S. Appl. No. 09/489,373 dated Feb. 10, 2005, 15 pages.

Response for U.S. Appl. No. 09/489,373 dated Apr. 20, 2005, 18 pages.

Examiner's Interview for U.S. Appl. No. 09/489,373 dated May 12, 2005, 3 pages.

Response for U.S. Appl. No. 09/489,373 dated May 27, 2005, 18 pages.

Non-Final Office Action for U.S. Appl. No. 09/489,373 dated Nov. 28, 2005, 18 pages.

Response for U.S. Appl. No. 09/489,373 dated Mar. 28, 2006, 7 pages.

Final Office Action for U.S. Appl. No. 09/489,373 dated May 17, 2006, 9 pages.

Response and Request for Continued Examination for U.S. Appl. No. 09/489,373 dated Nov. 17, 2006, 9 pages.

(56) References Cited

OTHER PUBLICATIONS

Notice of Allowance for U.S. Appl. No. 09/489,373 dated Jan. 10, 2007, 5 pages.
Response for U.S. Appl. No. 09/489,373 dated Apr. 10, 2007, 20 pages.
Non-Final Rejection for U.S. Appl. No. 11/733,570 dated May 5, 2008, 11 pages.
Amendment for U.S. Appl. No. 11/733,570 dated Jul. 30, 2008, 19 pages.
Final Office Action for U.S. Appl. No. 11/733,570 dated Oct. 27, 2008, 13 pages.
Amendment for U.S. Appl. No. 11/733,570 dated Jan. 27, 2009, 12 pages.
Notice of Allowance for U.S. Appl. No. 11/733,570 dated Feb. 18, 2009, 4 pages.
Interview Summary for U.S. Appl. No. 12/032,907 dated Nov. 19, 2009, 3 pages.
Interview Summary and Response for U.S. Appl. No. 12/032,907 dated Dec. 18, 2009, 7 pages.
Demand for Application No. PCT/US00/24386 dated Mar. 30, 2001, 5 pages.
Written Opinion for Application No. PCT/US00/24386 dated Jun. 22, 2001, 7 pages.
Amendment for Application No. PCT/US00/24386 dated Aug. 22, 2001, 14 pages.
International Preliminary Exam for Application No. PCT/US00/24386 dated Nov. 21, 2001, 6 pages.
Search Report for Application No. PCT/US00/24386 dated Jul. 14, 2005, 7 pages.
Office Action for Application No. EP00963318.1 dated Nov. 4, 2005, 4 pages.
Amendment for Application No. EP00963318.1 dated Apr. 28, 2006, 5 pages.
First Statement of Proposed Amendments for Application No. 74751/00 dated Mar. 16, 2005, 21 pages.
Office Action for Application No. 00814730.2 dated Apr. 27, 2007, 9 pages.
Baer, "Interactive Television Prospects for Two-Way Services on Cable" A Report prepared under a Grant from The John and Mary R. Markle Foundation, R-888-MF, Nov. 1971, 97 pages.
Berman, "The Technical Advantages and Application of Digitally-Encoded Video in Fiber Optic Transmission Networks", A Comparative Analysis for Consulting Engineers, End-User, and System Integrators, Intelligent Transportation Systems, International Fiber Systems, Inc. Jul. 14, 2001, 11 pages.
Gray et al., "Algorithms and Components for Data Transmission and Video Encoding", Department of Electrical Engineering and Computer Sciences, University of California—Berkeley, Final Report 1997-98 for MICRO Project 97-118, 6 pages.
Interactive Systems, Inc., Core Technology, Brochure, 18 pages.
Maney, "Cellphones or secret decoder rings?", USA Today, Jun. 21, 2000, 3 pages.
McKellips, "The 100 Day Report", The International Journal of ITV, Summer 1993, 15 pages.
Proceedings from Eleven Technical Sessions, 42nd Annual Convention and Exposition of the National Cable Television Association, Jun. 6-9, 1993, 6 pages.
Sturiale, "PBS and TV Answer Team to Bring Interactivity to Public Television", Transactions "The Source" of information in and around the nation's leader in interactive television, Jun. 1993, 9 pages.
TV Answer Applications, "The Electronic Marketplace—Money Manager, Interactive Sports, Catalog Shopping, Grocery Shopping, TV Search and Universal Remote are just a few of the applications TV Answer brings to the viewers home", Apr. 1993, 30 pages.
TV Answer News Summary, Feb. 1993, 5 pages.
Van, "Motorola device would connect instantly to Net", St. Louis Post-Dispatch, Business Section, Jul. 26, 2000, 1 page.
Wessel, "Gadget Envy, Masters of the New Economy, Americans Must Go Abroad to Find the Coolest Toys", The Wall Street Journal, Aug. 3, 2000.
Examiners Interview Summary for U.S. Appl. No. 11/733,570 dated Jan. 9, 2009, 2 pages.
Examiners Interview Summary for U.S. Appl. No. 11/876,548 dated Jun. 1, 2009, 2 pages.
Examiners Interview Summary for U.S. Appl. No. 11/876,548 dated Jan. 9, 2009, 2 pages.
Office Action Summary for U.S. Appl. No. 09/489,373 dated Jul. 28, 2005, 5 pages.
Examiners Interview for U.S. Appl. No. 09/489,373 dated Aug. 31, 2005, 2 pages.
Office Action Summary for U.S. Appl. No. 09/489,373 dated Sep. 1, 2005, 5 pages.
Response for U.S. Appl. No. 09/489,373 dated Oct. 3, 2005, 14 pages.
Response to Rule 312 Communication for U.S. Appl. No. 09/489,373 dated Oct. 10, 2007, 2 pages.
Office Communication for U.S. Appl. No. 09/489,373 dated Jun. 28, 2007, 2 pages.
Office Communication for U.S. Appl. No. 09/489,373 dated Jun. 7, 2007, 2 pages.

* cited by examiner

METHODS AND SYSTEMS FOR PROCESSING GAMING DATA

FIELD

The present application relates generally to the technical field of information processing. In one specific example, the present application relates to methods and systems for processing gaming data.

BACKGROUND

A user interacts with controls on a video game unit or other hand-held device to play a video game for entertainment purposes. The user may connect with other users of a network to participate jointly in a game, or the user may be a sole participant in the game.

DETAILED DESCRIPTION

Example methods and systems for processing gaming data are described. In the following description, for purposes of explanation, numerous specific details are set forth in order to provide a thorough understanding of example embodiments. It will be evident, however, to one of ordinary skill in the art that embodiments of the invention may be practiced without these specific details.

In some embodiments, a hand-held device receives gaming data associated with a gaming application. The hand-held device receives a content signal displayed or otherwise reproduced during presentation of programming content. Device content is presented on the hand-held device using gaming data synchronously with the presentation of the programming content based on a determination that the content signal includes a trigger.

The gaming data that has been received by the hand-held device may include puzzle data, map data, character data, weapon data, or any other data that may enhance or otherwise alter game play of the gaming application. The received gaming data may enhance the game play. For example, a new puzzle received as a portion of the gaming data may only become available when a television show that corresponds to the puzzle is aired on a television network.

Figure 1:
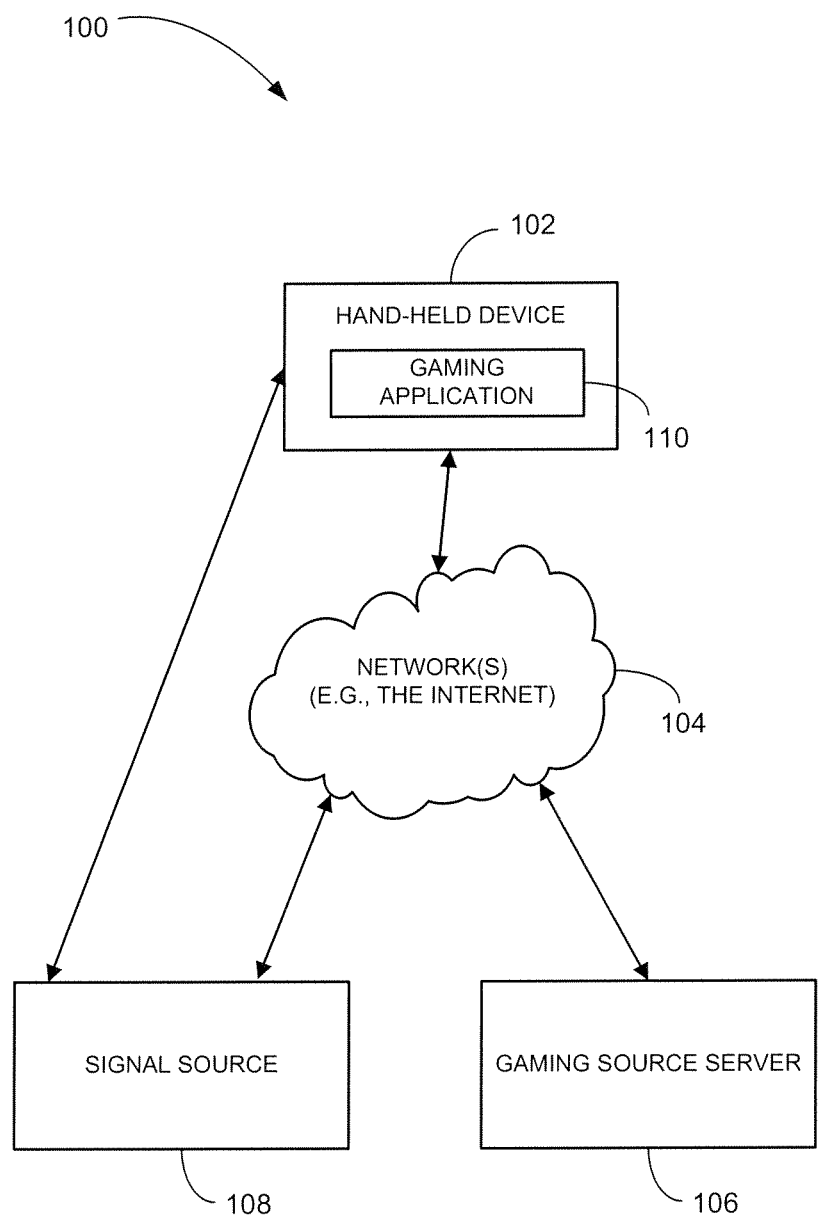
FIG. 1 is a block diagram of an example content processing system, according to an example embodiment.

FIG. 1 illustrates an example content processing system 100 in which a hand-held device 102 receives gaming data from a gaming source server 106 and a content signal from a signal source 108 and uses the received information to present device content on the hand-held device 102.

The hand-held device 102 is a portable gaming device, a personal digital assistant (PDA), a mobile telephone, a smart card, a portable computer, or the like. Other types of hand-held devices may also be used. In an example embodiment, the hand-held device 102 may include a CMOS imaging sensor, a 32-bit microprocessor and external memory. For example, the hardware of the hand-held device 102 may include OEM part number: 5080SR-1212A0R by Honeywell Imaging and Mobility, a color CMOS imaging device (e.g., the Omni Vision OV7670) and a 32-bit microcontroller (e.g., the Sunplus SPG293A).

A gaming application 110 is deployed on the hand-held device 102 and interacts with programming content (e.g. a game show) presented by the signal source 108. The gaming application 110 is a user interactive game that displays content on a display screen of the hand-held device 102 and may make sounds, vibration, and/or other interaction with the user to enable a user to "participate" or "interact" with the programming content. The programming content presented on the signal source 108 is ordinary programming content that other viewers or listeners may watch or listen without participating. The gaming application 110 may be a game of skill or luck, may involve a sweepstakes, and/or may involved performing one or more activities to enable a user of the hand-held device 102 to receive a promotional opportunity. In one embodiment, the user cannot interact with the gaming application 110 without watching or listening to the programming content. By watching or listening to the programming content, the user receives a content signal that includes a trigger to synchronize the gaming application 110 to the programming content and knows the opportunities to interact on the hand-held device with the programming content. For example, the programming content may include questions that the participants shown or heard on the programming content answer. A user operating the hand-held device 102 may answer the questions asked on the programming content by interacting with the gaming application 110. By answering the questions, the user may accumulate points that are redeemable for a prize.

Device content is presented on a display of the hand-held device 102 as one or more display screens of the gaming application 110. The information received by the hand-held device 102 and processed by the gaming application 110 may alter the presentation of the display screens, or the display screens may be presented solely based on the received information. Examples of the gaming application 110 are play along or home play versions of WHO WANTS TO BE A MILLIONAIRE and ARE YOU SMARTER THAN A FIFTH GRADER that may be played along with corresponding programming content (e.g., answering questions that are asked during ordinary episodes of the programming content). Other types of play along and non-play along gaming application may also be included.

A network 104 over which the hand-held device 102 is in communication with the gaming source server 106, the signal source 108, or both may include a Global System for Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. For example, the hand-held device 102 may be in communication with the gaming source server 106 through a first network, and may be in communication with a signal source 108 through a second, different network. Other conventional and/or later developed wired and wireless networks may also be used.

The gaming source server 106 is a computing device that transmits gaming data over the network 104 to the hand-held device 102. The gaming data may be provided by the gaming source server 106 on demand, through syndication, or may be otherwise provided. In some embodiments, the gaming source server 106 may be implemented as part of an existing server. For example, the gaming source server 106 may be integrated into APPLE ITUNES. In some embodiments, the gaming source server 106 may transmit one or more gaming application 110 to the hand-held device 102.

The gaming source server 106 may interact with the hand-held device 102 over the network 104 to provide gaming data, track scores of various users, provide electronic coupons, and the like. For example, a score or other performance indicator may be sent over the network 104 from the hand-held device 102 to the gaming source server 106. The gaming source server 106 may be associated with the game being presented on the signal source 108.

The signal source 108 is an electronic device that is capable of providing a content signal. The content signal may be directly received by the hand-held device 102, or may be received through the network 104. The signal source 108 may be located, by way of example, in the user's home or at a business. Examples of the signal source 108 include a display device, an audio reproduction device, or the like. The signal source 108 may receive the content signals from a television broadcast station, over the network 104, from a DVD, from local storage, or may otherwise be received. The content signals may include an encoded audio signal, an encoded video signal, or a different type of content signal. The audio signal may be encoded with RDS or otherwise encoded. The gaming source server 106 may be affiliated with the provider of content signals of the signal source 108. Promotional or other data may be enabled through use of the hand-held device 102 based on a presentation being made on the signal source 108.

One or more signal sources 108 may be used. For example, the source media 106 may be read from a first signal source 108, and the synchronization data may be received from a second signal source 108.

In an example embodiment of when the gaming application 110 is used in the system 100, the gaming application is played in conjunction with programming content displayed by the signal source 108. The gaming data that relates to a television show, a radio program, or other presentation of content is downloaded or otherwise received from the gaming source server 106. The gaming data is synchronized with the "live" broadcast of the televised or radio event by an audible or inaudible trigger to activate "live" game play on the hand-held device 102. The device content or other device activity is then presented or performed on the hand-held device 102 based on the synchronization of the gaming data using the trigger.

Figure 2:
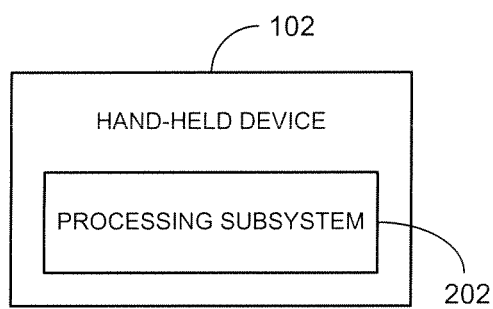
FIG. 2 is a block diagram of an example hand-held device that may be deployed within the system of FIG. 1, according to an example embodiment.

FIG. 2 illustrates an example hand-held device 102, according to an example embodiment. The hand-held device 102 is shown to include a processing subsystem 202. The processing subsystem 202 presents device content on the hand-held device 102 based on gaming data and/or triggers received. The hand-held device 102 with the processing subsystem 202 may be deployed in the systems 100, 200, or may be deployed in another system.

Figure 3:
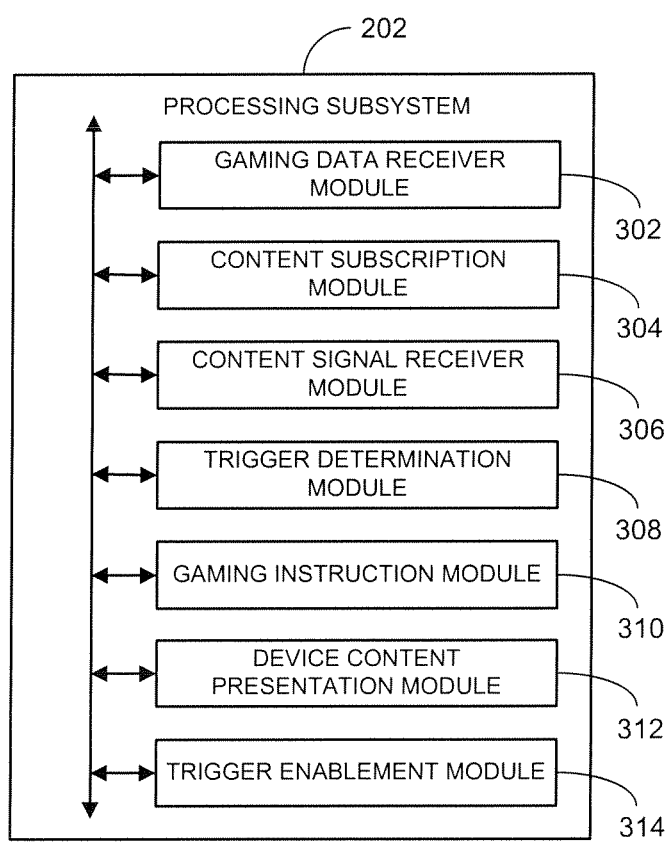
FIG. 3 is a block diagram of an example processing subsystem that may be deployed within the mobile electronic device of FIG. 1, according to an example embodiment.

FIG. 3 illustrates an example processing subsystem 202 that may be deployed in the hand-held device 102, or otherwise deployed in another system. One or more modules are communicatively coupled and included in the processing subsystem 202 to processing of gaming data. The modules of the processing subsystem 202 that may be included are a gaming data receiver module 302, a content subscription module 304, a content signal receiver module 306, a trigger determination module 308, a gaming instruction module 310, a device content presentation module 312, and a trigger enablement module 314. Other modules may also be included.

The gaming data receiver module 302 receives gaming data from the gaming source server 106. In some embodiments, the content subscription module 304 subscribes to a content subscription service with the gaming source server 106. The gaming data is then received based on the subscription.

The content signal receiver module 306 receives the content signal from the signal source 108 during presentation of programming content. The programming content may be presented by the signal source 108 receiving and reproducing the content signal.

The programming content is associated with the gaming application 110. For example, the programming content may be an episode of ARE YOU SMARTER THAN A FIFTH GRADER, the content signal may include the programming content, and the game may be a play along game with the episode.

The trigger determination module 308 determines whether the content signal includes a trigger. The content signal may include one or more triggers that are used to synchronize the presentation of the programming content with the game. When multiple triggers are used, the triggers may all include the same information or may have different information to activate a different response (e.g., different displays on the hand-held device 102). In some embodiments, the synchronization enables a user to play along or interact with programming content presented by the signal source 108.

In some embodiments, the processing subsystem 300 includes the gaming instruction module 310 to receive and process gaming instructions during presentation of the programming content and game play of the game. The gaming instructions are users interactions that are associated with play of the game. For example, the gaming instructions may include selection of an answer among multiple choices, a string of characters associated with an answer, character movement, or the like.

The device content presentation module 312 presents device content using the gaming data based on a determination that the content signal includes the trigger. For example, several different displays may be presented on the hand-held device 102 after the trigger is received. The different displays may ask include questions or request other game instructions from the user. By receiving one or more triggers, the different displays may be provided to a user of the hand-held device 102 in real-time or otherwise in coordination with the presentation of the programming content. In some embodiments, the device content is presented based on the determination that the content signal includes the trigger and processing of one or more gaming instructions. For example, a screen may notify the user of the hand-held device of points earned based on gaming instructions received from the user. In some embodiments, the trigger itself does not provide data that is used as part of the device content.

The enablement module 314 enables further game play of the game and/or a promotional opportunity based on a determination that the content signal includes the trigger. The further game play or promotional opportunity, in some embodiments, is reflected on one or more displays of the gaming application 110. Further game play may include extended and/or enhanced play of the gaming application 110. The promotional opportunity may include points, credits, electronic coupons, additional gaming opportunities, or the like. The promotional opportunity may be available on the hand-held device 102, or may be available after enablement on a remote site (e.g., the gaming source server 106).

Figure 4:
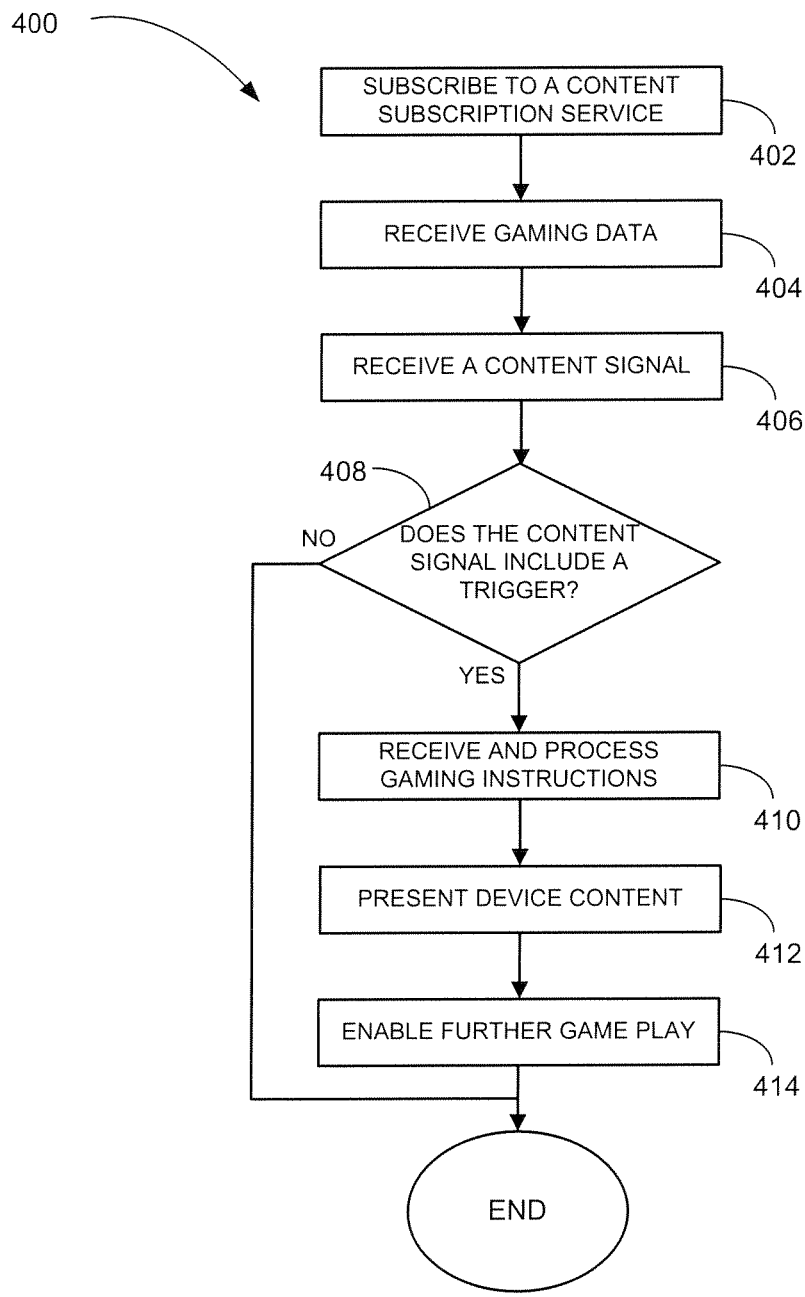
FIG. 4 is a block diagram of a flowchart illustrating method for processing gaming data, according to an example embodiment.

FIG. 4 illustrates a method 400 for processing gaming data to an example embodiment. The method 400 may be performed by the hand-held device 102 of the system 100 (see FIG. 1), or may be otherwise performed.

In some embodiment, a content subscription service with the gaming source server 106 is subscribed at block 402.

Gaming data is received from the gaming source server 106 at block 404. When a content subscription is used, the gaming data may be received at block 404 from the gaming source server 106 in accordance with the content subscription. The content subscription may be a Really Simple Syndication (RSS) feed, other types of web syndication, or another type of content subscription.

The content signal is received from the signal source 108 during presentation of programming content at block 406. The content signal may be a video signal (e.g. with or without an audio component) or an audio signal.

A determination of whether the content signal includes the trigger is made at decision block 408. The trigger may be an audio signal or a video signal. In some embodiments, the trigger is embedded in the video signal to be substantially invisible to an ordinary viewer of the presentation during the presentation of the programming content. For example, the trigger may be modulated in an active portion of the video signal. In other embodiments, the trigger is embedded in the audio signal (or audio component of the video signal) substantially inaudible to an ordinary listener of the presentation during the presentation of the programming content. For example, the trigger may be embedded in the audio signal with echo modulation. In other embodiments, the trigger is visible and/or audible.

In some embodiments, the determination performed at block 408 may further include determining whether the gaming data is associated with the gaming application 110. For example, the gaming data may be for a specific type of gaming application 110, or may be intended for one or more particular hand-held devices of all distributed hand-held devices (e.g., as a sweepstakes). The trigger may, in some embodiments, be matched with the gaming data during the operations performed at block 408 as part of the determination.

In some embodiments, additional indentifying information (e.g., episode identifiers) may be included in the gaming data and/or along with or as part of the trigger to enable the receipt of the trigger to synchronize the gaming data for presentation as part of the device content.

If a determination is made that the content signal does not include the trigger, the method 400 may terminate. If a determination is made that the content signal includes the trigger, the method 400 may proceed to block 410 or block 412.

In some embodiments, gaming instructions are received and processed during the presentation of the programming content and the game play of the game at block 410.

At block 412, device content is presented using the gaming data based on a determination that the content signal includes the trigger. In some embodiments, the device content is presented using the gaming data based on the determination that the content signal includes the trigger and the processing of one or more gaming instructions.

In some embodiments, the presentation of the device content relies on the synchronization of the programming content using the trigger. For example, the programming content may describe a question, and the device content may provide the user of the hand-held device 102 with the available answers to the question. In another example, the programming content may described an answer, and the device content may prompt the user to enter in the question.

In some embodiments, further game play of the game is enabled at block 414 based on a determination that the content signal includes the trigger. In some embodiments, the promotional opportunity is enabled at block 414 based on a determination that the content signal includes the trigger. The promotional opportunity may be received from and/or redeemed with a device (e.g., the signal source server 106) through the network 104, or promotional opportunity may be redeemed by physically taking the hand-held device 102 into a store for redemption.

In some embodiments, the game play of the game and the further game play of the game occur in real-time during the presentation of the programming content.

Figure 5:
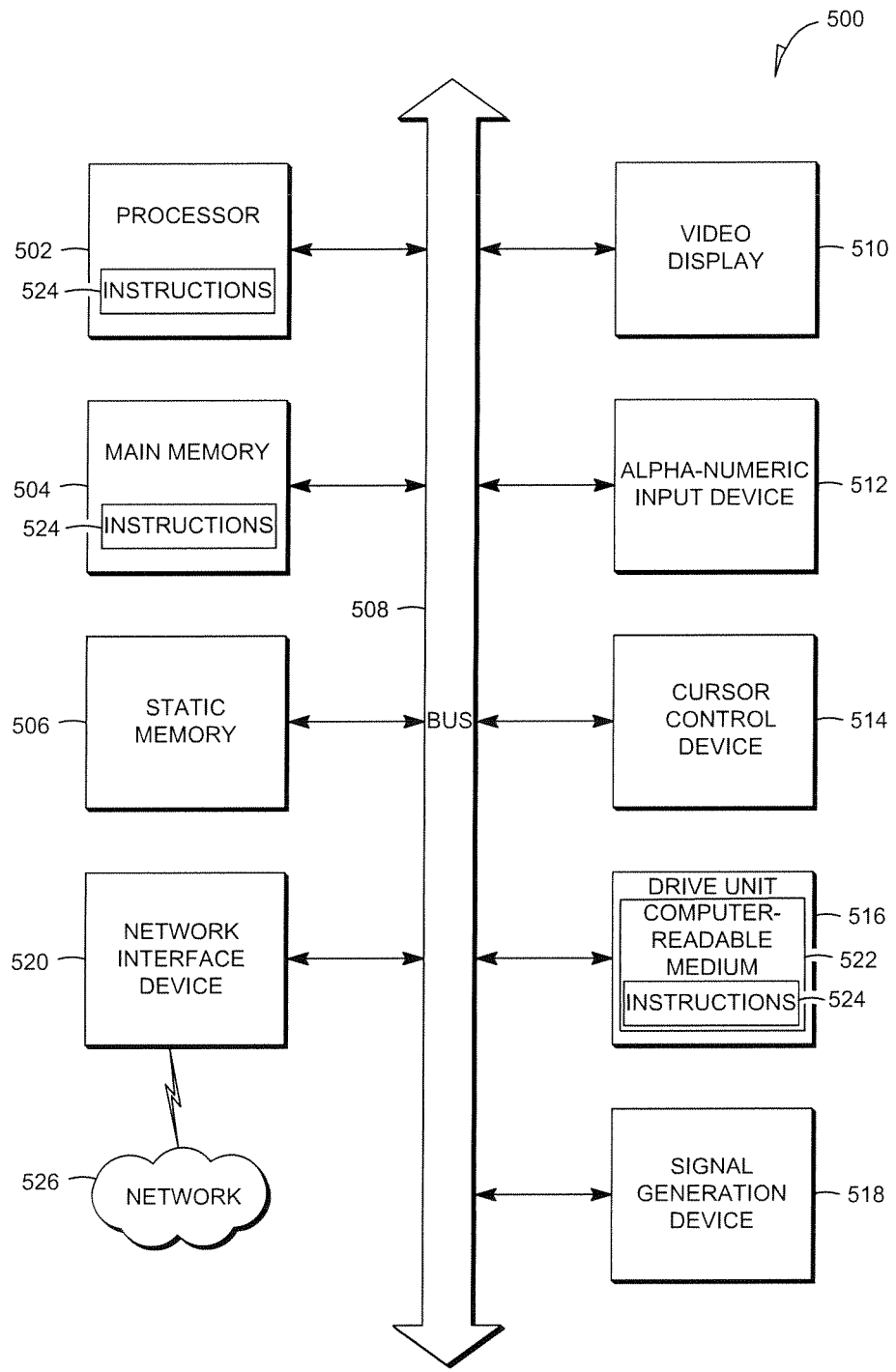
FIG. 5 is a block diagram of a machine in the example form of a computer system within which a set of instructions for causing the machine to perform any one or more of the methodologies discussed herein may be executed.

FIG. 5 shows a block diagram of a machine in the example form of a computer system 500 within which a set of instructions may be executed causing the machine to perform any one or more of the methods, processes, operations, or methodologies discussed herein. The hand-held device 102 may include the functionality of the one or more computer systems 500. The gaming source server 106, the signal source 108, or both may include the functionality of the one or more computer systems 500.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 512 (e.g., a central processing unit (CPU) a graphics processing unit (GPU) or both), a main memory 504 and a static memory 506, which communicate with each other via a bus 508. The computer system 500 may further include a video display unit 150 (e.g., a liquid crystal display (LCD) or a cathode ray tube (CRT)). The computer system 500 also includes an alphanumeric input device 512 (e.g., a keyboard), a cursor control device 514 (e.g., a mouse), a drive unit 516, a signal generation device 518 (e.g., a speaker) and a network interface device 520.

The drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 512 during execution thereof by the computer system 500, the main memory 504 and the processor 512 also constituting machine-readable media.

The software 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention. The term "machine-readable medium" shall accordingly be taken to include, but not be limited to, solid-state memories, and optical media, and magnetic media.

Certain systems, apparatus, applications or processes are described herein as including a number of modules. A module may be a unit of distinct functionality that may be presented in software, hardware, or combinations thereof. When the functionality of a module is performed in any part through software, the module includes a machine-readable medium. The modules may be regarded as being communicatively coupled.

The inventive subject matter may be represented in a variety of different embodiments of which there are many possible permutations. In an example embodiment, gaming data is received from a gaming source server. The gaming data associated with a game. A content signal is received from a signal source during presentation of programming content. The programming content is associated with the content signal and the game. A determination of whether the content signal includes the trigger is made. The device content is presented using the gaming data. The device content is in synchronization with the presentation of the programming content based on a determination that the content signal includes a trigger.

Thus, methods and systems for processing gaming data have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion. Although "End" blocks are shown in the flowcharts, the methods may be performed continuously.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:
receiving gaming data at a processing device from a gaming source server, the gaming data associated with a game;
receiving, at the processing device, a content signal from a signal source during presentation of an episodic television program that presents one or more questions to viewers who are not playing the game and to at least one user of the processing device that is playing the game using the processing device, the content signal obtained from a source other than the gaming source server, the television program associated with the content signal and the game, the television program presented on the signal source and presenting a user of the processing device with the one or more questions that are part of the game that is presented to the user via display of the television program to the user;
determining, using one or more processors, whether the content signal includes an audio trigger in the content signal;
reproducing device content, on the processing device, using the gaming data during execution of a gaming application that implements the game on the processing device, the device content reproduced in synchronization with the presentation of the questions presented in the television program based on a determination that the content signal includes the audio trigger, the device content that is reproduced including multiple potential choices of answers to the one or more questions that are part of the game being presented to the user via the television program, wherein the gaming data is synced with the television program so that the user can select the answers to respond to the one or more questions when the one or more questions are presented via the television program; and
enabling a promotional opportunity based on a determination that the content signal includes the audio trigger.

2. The method of claim 1, further comprising:
enabling further game play of the game using the gaming data based on a determination that the content signal includes the audio trigger.

3. The method of claim 1, wherein the promotional opportunity includes continued play of the game, redeemable points, or combinations thereof.

4. The method of claim 1, further comprising:
subscribing the processing device with a content subscription service of the gaming source server, wherein the gaming data received is based on the subscribing such that the gaming data is received by the processing device through syndication.

5. The method of claim 1, further comprising:
receiving a plurality of gaming instructions during the presentation of the programming content from a user controlling the processing device and during play of the game on the processing device; and
processing the plurality of gaming instructions during the presentation of the programming content and the play of the game, wherein the device content is reproduced on the processing device using the gaming data and based on the determination that the content signal includes the audio trigger and the processing of a designated gaming instruction of the plurality of gaming instructions.

6. The method of claim 1, wherein the execution of the gaming application on the processing device occurs in real-time during the presentation of the programming content such that the execution of the gaming application and presentation of the multiple potential choices of answers to the questions is synced in time with the questions presented via the programming content.

7. The method of claim 1, wherein the gaming data includes puzzle data, map data, character data, weapon data, or combinations thereof.

8. The method of claim 1, further comprising:
receiving a user interaction in response to reproduction of the device content; and
transmitting user response data based on receipt of the user interaction.

9. The method of claim 1, wherein the audio trigger is an inaudible listener-imperceptible audio trigger.

10. The method of claim 1, wherein the content signal includes a video trigger that is separate from the audio trigger and that is produced with video of the content signal during the presentation of the television program.

11. The method of claim 1, wherein the audio trigger is embedded in the audio using echo modulation.

12. The method of claim 1, wherein the gaming data includes puzzle data.

13. The method of claim 1, further comprising receiving a user-initiated request for the gaming data, wherein receiving the gaming data occurs responsive to receiving the user-initiated request.

14. The method of claim 1, further comprising presenting, on the processing device, scores of one or more other users that are playing the game in synchronization with the television program and with the execution of the gaming data on the processing device.

15. The method of claim 1, wherein the audio trigger is a first trigger of plural triggers in the content signal that are associated with different displays to be reproduced on the processing device, and further comprising determining whether the content signal includes one or more additional triggers of the plural triggers, wherein reproducing the device content includes presenting plural different displays on the processing device that correspond to different ones of the plural triggers.

16. A system comprising:
a gaming data receiver module to receive gaming data from a gaming source server, the gaming data associated with a game;
a content signal receiver module to receive a content signal from a signal source during presentation of a television program that presents one or more questions to viewers who are not playing the game and to at least one user of a processing device that is playing the game using the processing device, the content signal obtained from a source other than the gaming source server, the television program associated with the content signal and the game, the television program presented on the signal source and presenting the user of the processing device with the one or more questions that are part of the game that is presented to the user via display of the television program to the user;
a trigger determination module including one or more processors to determine whether the content signal received by the content signal receiver module includes an audio trigger; and
a device content module to reproduce device content using the gaming data during execution of a gaming application that implements the game on the processing device, the gaming data received by the gaming data receiver module, the device content reproduced in synchronization with the presentation of the questions shown in the television program, based on a determination that the content signal includes the audio trigger by the trigger determination module, the device content that is reproduced including multiple potential choices of answers to the questions that are part of the game being presented to the user via the television program, wherein the gaming data is synced with the television program so that the user can select the answers to respond to the one or more questions when the one or more questions are presented via the television program; and
an enablement module to enable a promotional opportunity based on a determination that the content signal includes the audio trigger.

17. The system of claim 16, wherein the content signal includes a video signal and a video trigger that is substantially imperceptible to a human viewer during the presentation of video of the programming content.

18. The system of claim 17, wherein the signal source includes a display device.

19. The system of claim 18, wherein the display device outputs the audio trigger.

20. The system of claim 19, wherein the audio trigger is encoded using echo modulation.

21. The system of claim 16, wherein the audio trigger is encoded using echo modulation.

22. The system of claim 16, wherein the audio trigger is imperceptibly encoded in audio of the content signal.

23. A non-transitory machine-readable medium comprising instructions, which when executed by one or more processors, cause the one or more processors to perform the following operations:
receive gaming data from a gaming source server, the gaming data associated with a game;
receive a content signal from a signal source during presentation of a television program that presents one or more questions to viewers who are not playing the game and to at least one user of a processing device that is playing the game using the processing device, the content signal obtained from a source other than the gaming source server, the television program associated with the content signal and the game, the television program presented on the signal source and presenting a user of the processing device with the one or more questions that are part of the game that is presented to the user via display of the television program to the user;
determine whether the content signal includes an audio trigger;
reproduce device content using the gaming data during execution of a gaming application that implements the game on the processing device, the device content reproduced in synchronization with the presentation of the television program based on a determination that the content signal includes the audio trigger, the device content that is reproduced including multiple potential choices of answers to the one or more questions that are part of the game being presented to the user via the television program, wherein the gaming data is synced with the content signal so that the user can select the answers to respond to the one or more questions when the one or more questions are presented via the television program; and
enable a promotional opportunity based on a determination that the content signal includes the audio trigger.

24. The machine-readable medium of claim 23, wherein reproduction of the device content during the execution of the gaming application occurs in real-time during the presentation of the television program such that the execution of the gaming application and presentation of the multiple potential choices of answers to the questions is synched in time with the questions presented via the television program.

25. The machine-readable medium of claim 23, wherein the audio trigger is imperceptible to a human listener during the presentation of the television program.

26. The machine-readable medium of claim 23, wherein the audio trigger is imperceptibly encoded in audio of the content signal.

* * * * *